United States Patent [19]
Vojvodich et al.

[11] 4,227,260
[45] Oct. 7, 1980

[54] ELECTRONIC ACTIVE STAR ELEMENT FOR AN OPTICAL DATA TRANSMISSION SYSTEM

[75] Inventors: Mario M. Vojvodich, Morris Plains, N.J.; Charles E. Theall, Jr., Weston, Conn.

[73] Assignee: The Singer Company, Little Falls, N.J.

[21] Appl. No.: 958,281

[22] Filed: Nov. 6, 1978

[51] Int. Cl.³ .......................... H04B 9/00; G02B 5/14
[52] U.S. Cl. ................................ 455/601; 350/96.16; 455/607
[58] Field of Search .................. 250/199; 350/96.15, 350/96.16

[56] References Cited
U.S. PATENT DOCUMENTS

| 3,883,222 | 5/1975 | Gunderson | 350/96.18 |
| 3,943,358 | 3/1976 | Reymond et al. | 250/199 |

Primary Examiner—John C. Martin
Assistant Examiner—Edward L. Coles
Attorney, Agent, or Firm—John C. Altmiller; Thomas W. Kennedy

[57] ABSTRACT

In order to more efficiently transmit optical data on an optical data bus to a number of members of an optical data transmission community, an electronic active star element which receives signals from each of a plurality of remote terminals, converts the optical signals to electrical signals, amplifies them, and transmits them to the remaining remote terminals is provided.

14 Claims, 3 Drawing Figures

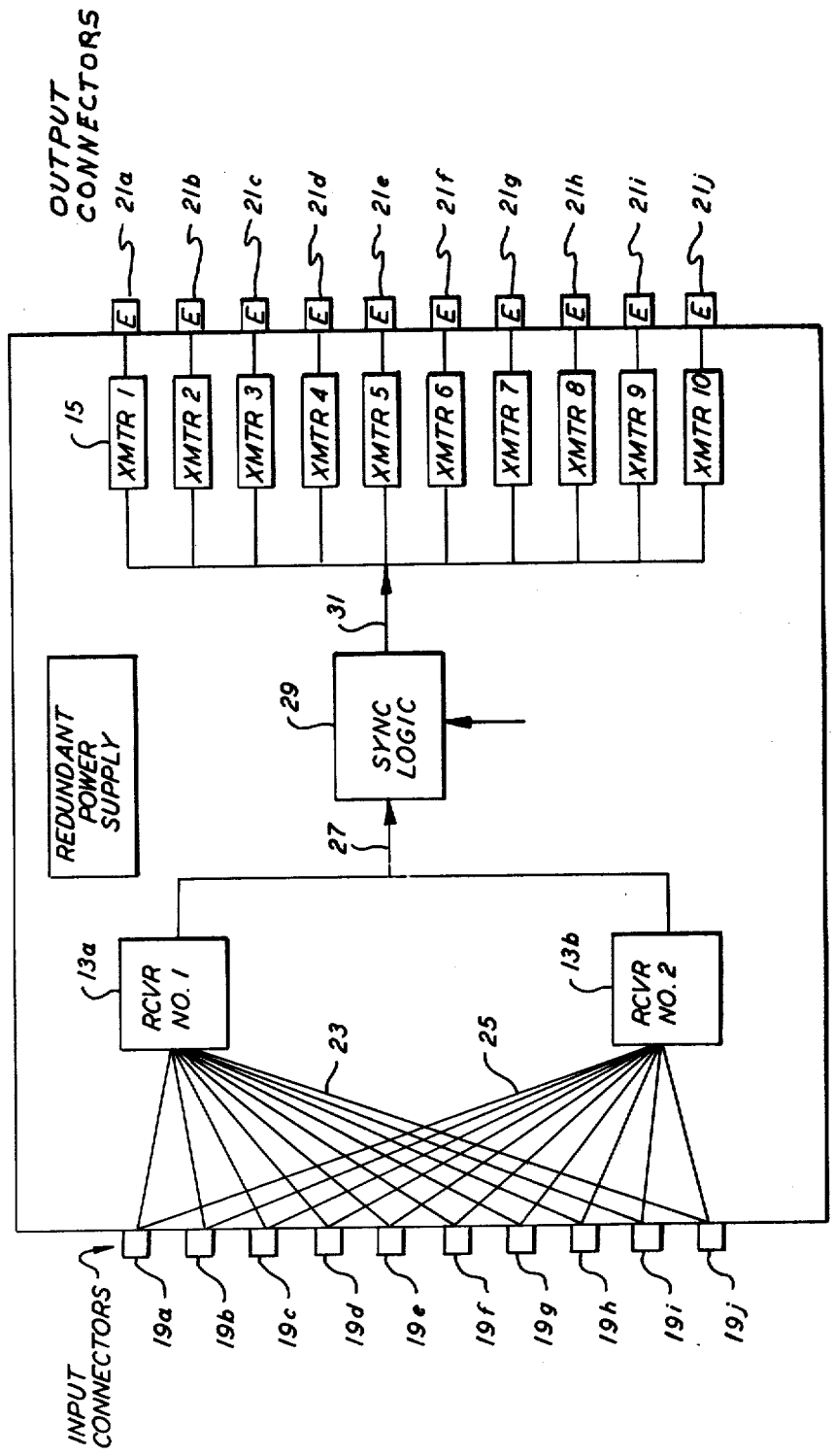

ELECTRONIC ACTIVE STAR ELEMENT FOR AN OPTICAL DATA TRANSMISSION SYSTEM

This invention relates to optical data transmission system in general and more particularly to an electronic active star element which aids in providing distribution of data to all members of an optical data transmission community such that all remote terminals on the data bus can communicate with each other.

In many applications, optical data transmission systems are being used to replace electrical data transmission systems which were formerly used. In many respects, the optical data transmission system is superior. For example, it is not as subject to cross talk and more particularly is not subject to electromagnetic disturbance from the outside. In such data transmission systems, data in electrical form is converted into an optical signal which is then transmitted over optical fibers to a receiver where the signal is converted back into an electrical signal. In certain optical data transmission systems there is a community of remote terminals all of which must be capable of communicating with each other. An example of this might be in an aircraft where a navigation computer is installed and must communicate both with fire control systems and with an instrument panel. Thus, in this simple example there are three separate terminals. Each terminal must be capable of receiving data from and transmitting data to the other two terminals. Furthermore, particularly when used in military applications, such systems must incorporate a certain amount of redundancy.

The typical method of supplying data to two or more terminals from another single terminal was by splitting optical power utilizing optical star couplers or radial arm couplers. These devices comprise passive optical devices constructed with glass mixing rods that exhibit large insertion losses. Losses are proportional to the following:

Insertion Loss (db) = 10 log K + 10 log n
K = optical efficiency
n = number of ports The primary disadvantage of these prior art methods is their large insertion loss. Although an example was given above of a three terminal system, systems having considerably more terminals are more typical. The input and output from the remote terminals to the coupler are normally referred to as ports. A ten port device is not uncommon. The typical insertion loss for a ten port optical star coupler constructed according to the prior art would be approximately 14 db.

Thus, the need for an improved coupler which provides distribution of an optical data system to all members, i.e., remote terminals, of an optical data transmission community in such a manner that all the remote terminals on the data bus can communicate with each other without a large insertion loss, and preferably with an insertion gain, becomes evident.

SUMMARY OF THE INVENTION

The present invention fills this need. In an optical data transmission community of the type described above, distribution of an optical data signal to all members of an optical data transmission community is accomplished through the use of an electronic active star element. The electronic active star element accepts n, where n is any whole number, optical inputs, one at a time and provides n optical outputs. As its name implies, the coupler is an active device. Incoming optical signals are converted into electrical signals at the coupler, are then amplified and distributed to the remaining terminals.

The present invention can be implemented in a number of ways which provide reliability and redundancy. In a first embodiment, a separate receiver and transmitter is provided for each cable to member of the community. The receivers convert the optical information to an electrical signal which is supplied to all transmitters. The transmitters then send the signal, now amplified to all members of the community.

In another embodiment, optical information from each of a plurality of input detectors is led both to a first receiver and a second receiver utilizing optical elements such as fiber optics or a beam splitter. Thus, the same optical information is supplied to both receivers. The receivers include a single photodetector along with amplifying means. The optical signal is thus converted into an electrical signal and amplified. After being coupled through any necessary synchronization or signal restoring logic, this electrical signal is then provided to a plurality of transmitters each driving an appropriate light emitter located at the output of the electronic active star element. Thus, the incoming signal is supplied to each of the output ports.

In another illustrated embodiment, rather than providing a single transmitter for each output, a smaller number of transmitters, e.g., two or four, are utilized with each transmitter supplying a plurality of outputs through optical means such as fiber optics or a beam splitter. As with the inputs, each output is supplied by at least two transmitters. In addition, the optical signals are converted into electrical signals individually and the electrical signals then fed into the receivers. This again provides the necessary redundancy to take care of failures.

If such a capability is not required, then the system could comprise a single receiver including amplification means and a single transmitter with all of the inputs coupled into the receiver and all of the outputs supplied from the single transmitter.

In general, the following is possible: 1. Conversion of each of the individual inputs into an electrical signal and combining of these electrical signals in one or more receivers; 2. Transmission of each individual optical signal to one or more receivers for combination and conversion of the combined signal to an electrical signal; 3. Conversion of the amplified signal to an optical signal at the one or more transmitters and transmission of the optical signal to the individual outputs; and 4. Transmission of the amplified electrical signal from the transmitters to a separate output emitter for each output.

Any combination of the input and output configurations noted above is possible.

BRIEF DESCRIPTION OF THE DRAWINGS

FIG. 2 is a block diagram of a second embodiment of the present invention.

DETAILED DESCRIPTION OF THE INVENTION

Figure 1:
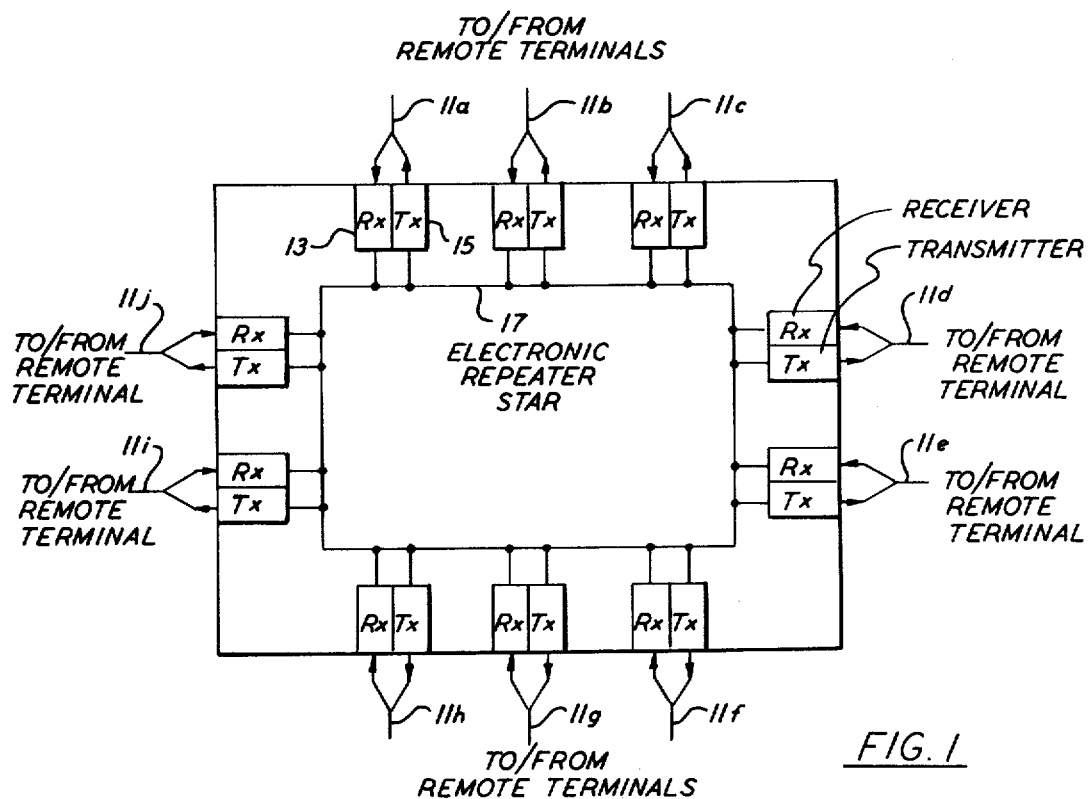
FIG. 1 is a block diagram illustrating a first embodiment of the system of the present invention.

FIG. 1 is a basic block diagram of a ten port electronically active star element having multiple receivers and transmitters constructed in accordance with the present invention. Each of ten remote terminals are coupled to the electronic active star element over an optical cable, e.g., an optical fiber or plurality of optical fibers. These individual optical cables are designated 11a through 11j on the figure. In the embodiment shown on FIG. 1, each of these cables is split, so as to be able to be coupled to a receiver 13 and a transmitter 15. As an example of the system operation, it might be desired that an incoming signal on cable 11a be transmitted to each of the remaining cables 11b through 11j. The incoming signal is received by the receiver 13 at which point it is converted into an electrical signal. For example, the receiver 13 will be a photodetector and an amplifier. The output of the receiver is coupled to a common repeater star line 17 which causes this signal to be transmitted to each of the transmitters 15. The transmitters 15 comprise light emitting means, for example, a LED or laser diode, with any necessary drivers or amplifiers. Thus, the electrical signal is converted back into an optical signal at each of the transmitters 11b through 11j and is transmitted to each of the remote terminals. Similarly, signals from any of the other terminals are converted into electrical signals in their associated receiver 13 and retransmitted to each other remote terminal by means of the associated transmitters 15. This arrangement provides both signal gain and splitting, in contrast to conventional optical star couplers, which split signals, but with a net loss of signal power.

A second implementation is illustrated in FIG. 2. The electronic active star element is again a ten port device having ten input connectors 19a through 19j and ten output connectors 21a through 21j. These are connected to the individual cables such as the cables 11a through j of FIG. 1. In other words, both the input connector 19a and the output connector 21 are coupled to one individual optical cable 11a. The output connectors include emitters, i.e. light sources. In this embodiment, each of the light sources or mitters E is driven by an individual transmitter 15 which supplies the necessary driving power for the emitter. A wire connection is made between each transmitter 15 and emitter E. Alternatively, the emitter E could be located right at the transmitter 15 by an optical connection made from the transmitter to the appropriate output connector. At the input, only two receivers are used, each containing a single photodetector. Signals from all of the input connectors 19a through 19j are provided to both the receiver 13a and to the receiver 13b. Connection is made by separate fiber optical connections between the input connectors and the receivers. Thus, there is one set of optical fibers 23 coupling the connectors 19a through 19j to receiver 13a and a second set of optical fibers 25 coupling the connectors 19a through 19j to the receiver 13b. Alternatively, coupling from the input connectors 19a through 19j to the receivers 13a and 13b can be done utilizing beam splitters. In the receivers 13a and 13b the optical data is converted into electrical signals and amplified. The two outputs from receivers 13a and 13b are supplied on a line 27 as an input to synchronization or restoration logic 29 where they are combined, the output of which on line 31 is supplied to drive each of the transmitters 15. The synchronization logic is of conventional design and is utilized to carry out any necessary signal conditioning and resynchronization of the data signals in well known fashion. The coupling of all input signals to two receivers provides redundancy should there be a failure of one of the receivers or of one of the optical fibers in the group 23 or 25.

Figure 3:
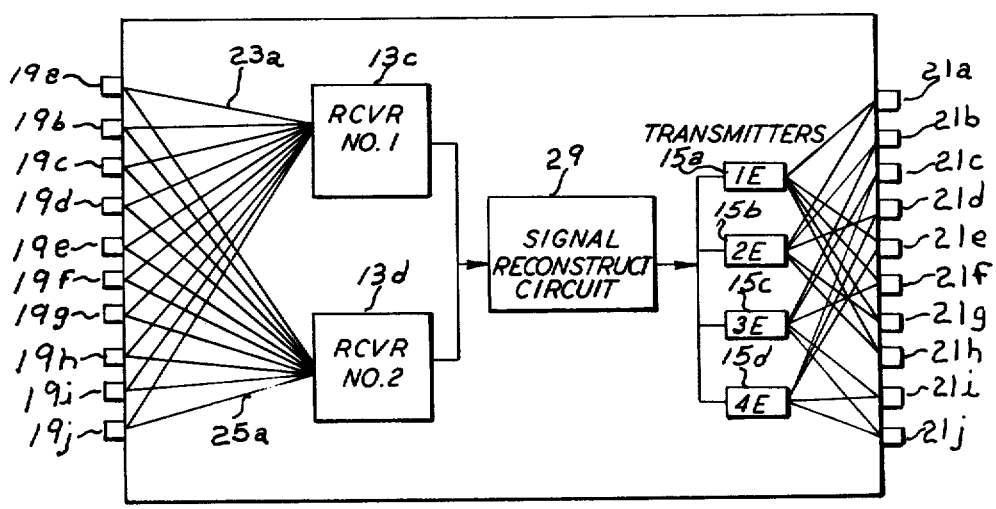
FIG. 3 is a similar block diagram of another embodiment of the present invention.

A third embodiment of the present invention is illustrated by FIG. 3. In this embodiment, each of the input connectors 19a through 19j includes a detector, i.e., a photodetector. Thus, each input is individually converted to an electrical signal immediately. The resulting electrical signals are then coupled over a group of wires 23a and a group of wires 25a to receivers 13c to 13d, respectively. The output on a common wire 27 is supplied to a signal reconstruction circuit 29 where necessary signal reconstruction, such as by pulse shaping and any necessary synchronization takes place in well known fashion. The output of this circuit on line 31 is supplied to four separate transmitters 15a through 15d. Each transmitter supplies five of the output connectors 21a through 21j. In this embodiment, the emitters are located at the transmitters and the signal is coupled optically over lines 33, e.g., fiber optics to the associated output connectors. For example, in the illustrated embodiment, the transmitter 15a supplies the output connectors 21a, 21e, 21f 21g and 21h. The transmitter 15d supplies the output connectors 21i, 21j, 21c, 21d and 21e. Similarly, the other two transmitters each supply five output connectors so that each output connector receives inputs from two separate transmitters, again resulting in a redundancy.

The various embodiments illustrated offer various advantages. In the embodiment of FIG. 1, the dynamic range of the optical signal both at the input ports and at the remote terminals is minimized, because each system transmitter is connected to dedicated receiver. The optical signal range [OSR] is a function only of component loss variations due to temperature sensitivity, aging and nuclear radiation. This greatly reduces the complexity of the receiver design.

The embodiment of FIG. 2 reduces the OSR only at the remote terminals. The two receivers 13a and 13b will experience a larger OSR because of the variable transmission path lengths from the remote terminals and the different number of connectors in each path. Then utilizing this configuration in a system, it is preferable to use two types of receivers: One capable of operation with a large OSR for the electronically active star terminal and another, of less complexity, for the remote terminals. At this point it might be noted, that the receivers, which include amplification means, automatic gain control and so forth are of conventional design well known in the art. As compared with the embodiment of FIG. 1, the embodiment of FIG. 2 gives advantages in redundancy. In the embodiment of FIG. 1, the failure of a single receiver or transmitter will prevent the transmission of incoming or outcoming data from one of cables 11a through 11j. On the other hand, in the embodiment of FIG. 2, although the same occurs with respect to transmitters, one of the receivers 13a and 13b can fail and the system will still respond to all inputs.

The input end of the embodiment of FIG. 3 also has this redundancy utilizing dual redundant receivers 13d and 13c with respect to the electronic portions of the receiver. Individual detectors are used so that failure of one of the detectors could result in a loss of that channel. This system also has redundancy on the output, with each output connector 21a through 21j fed by two separate receivers. With this arrangement, a failure in one transmitter could not cause a complete failure in transmission to any remote terminal. Five of the output ports of transmit would be at half power and five would continue at full power. When two failures occur concurrently, four ports will transmit at half power, three ports at full power and three ports with no output. By increasing the number of transmitters to five, one failure would result in four ports at half power and six at full power and two failures in six at half power, three a full power and one at zero power. Depending on the required system reliability, the number of transmitters, and for that matter receivers can be increased or decreased over that shown on the figures. Furthermore, as noted above, and as illustrated by the systems of FIGS. 2 and 3, transmission between the input connectors and the receivers and between the transmitters and the output connectors can either by means of wire or optical transmission, e.g., optical fibers or beam splitters, depending on whether it is desired to locate the photodetectors and emitters at the receivers or the transmitter, in which case the signals are combined at that point, or at the input or output connectors in which case combined electrical signals are received or transmitted.

The present invention provides many advantages in its application to multi-terminal fiber optic data communication systems. Emitters that are practical from a size, cost, temperature of operation and radiation considerations are available. Such emitters can generate signal powers on the order of 1 milliwatt. Attendant losses from connectors, cables, passive couplers and optical interface which are typically in excess of 55 db for passively configured systems result in an unacceptable performance due to negative signal to noise ratios. In contrast, the use of the present invention in a similar configuration allows for realizable system BER (Bit Error Rate) performance of greater than $10^{-9}$ because the system losses are offset by the gain provided by the electronically active star element. Furthermore, the gain is provided with minimal hardware and minimal cost.

What is claimed is:

1. An electronically active star element for interconnecting remote terminals in a multi-terminal fiber optic data communication system in which a plurality of remote terminals are coupled to each other over an optical transmission data bus, each terminal having the capability to transmit to every other terminal and to receive from every other terminal over an optical cable which forms the data bus, each remote terminal thus having associated therewith an optical cable which must be interconnected with the optical cable from each other data terminal, comprising:
   (a) first means to convert the optical signals on all of the optical cables into amplified electrical signals comprising at least first and second receivers and means for coupling the signal from each of said cables to both of said receivers;
   (b) second means to convert said amplified electrical signals back into an optical signal; and
   (c) third means to couple said optical signal to each of said optical cables.

2. Apparatus according to claim 1 wherein an individual photodetector is provided for each of said cables disposed so as to convert the optical signals on said cable to an electrical signal and wherein said means for coupling comprise means for coupling the electrical output of each of said photodetectors to each of said receivers.

3. Apparatus according to claim 1 wherein each of said receivers included a photodetector located at said receivers and wherein said means for coupling the signal from each of said optical cables comprises means for optically connecting the signal from each cable to the photodetector at each of said receivers.

4. Apparatus according to claim 3 wherein said means for coupling comprise optical fibers.

5. Apparatus according to claim 3 wherein said means for coupling comprise a beam splitter.

6. An electronically active star element for interconnecting remote terminals in a multi-terminal fiber optic data communication system in which a plurality of remote terminals are coupled to each other over an optical transmission data bus, each terminal having the capability to transmit to every other terminal and to receive from every other terminal over an optical cable which forms the data bus, each remote terminal thus having associated therewith an optical cable which must be interconnected with the optical cable from each other data terminal, comprising:
   (a) first means to convert the optical signals on all of the optical cables into amplified electrical signals;
   (b) at least two transmitters adapted to receive said amplified electrical signals and to provide an output signal capable of driving an emitter;
   (c) at least two emitters; and
   (d) means for coupling the output of said transmitters to said emitters and for coupling the outputs of said emitters to said optical cables.

7. Apparatus according to claim 6 wherein an emitter is provided for each optical cable and said means for coupling said emitters and said cables comprise output connectors in which said emitters are disposed, said output connectors also capable of receiving said cables and wherein said receivers are coupled to said emitters by wiring, each receiver providing an output to at least one emitter.

8. Apparatus according to claim 7 wherein each emitter is supplied by at least two receivers.

9. Apparatus according to claim 8 wherein said system is a ten port system supplying ten remote terminals and wherein four transmitter are provided, each transmitter being coupled to five emitters.

10. Apparatus according to claim 6 wherein said emitters are located at said transmitters and said means for coupling said emitters to said optical cables comprise a plurality of output connectors, one for each cable capable of receiving said cable and optical means coupling the optical output of said emitters to said connectors.

11. Apparatus according to claim 10 wherein each of said connectors is supplied by at least two of said emitters.

12. Apparatus according to claim 10 wherein said optical coupling means comprise fiber optics.

13. Apparatus according to claim 10 wherein said coupling means comprise beam splitters.

14. An electronically active star element for interconnecting remote terminals in a multi-terminal fiber optic data communication system in which a plurality of remote terminals are coupled to each other over an optical transmission data bus, each terminal having the capability to transmit to every other terminal and to receive from every other terminal over an optical cable which forms the data bus, each remote terminal thus having associated therewith an optical cable which must be interconnected with the optical cable from each other data terminal comprising:

(a) an individual receiver associated with each of said optical cables, said receiver including a photodetector and amplification means, converting its associated signal into a corresponding amplified electrical signal;

(b) a plurality of transmitters, one being provided for each of said optical cables and including an emitter and means for driving said emitter; and (c) means interconnecting the outputs of all of said transmitters to each of said optical cables whereby a signal from any of said receivers will be coupled as an input to all of said transmitters.

* * * * *